United States Patent
Malhotra et al.

(10) Patent No.: US 11,341,530 B2
(45) Date of Patent: May 24, 2022

(54) TRAVEL DESTINATION PREDICTOR

(71) Applicant: Visa International Service Association, San Francisco, CA (US)

(72) Inventors: Hardeep Singh Malhotra, Dubai (AE); Ghanashyama Mahanty, Dubai (AE)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 9 days.

(21) Appl. No.: 16/749,192

(22) Filed: Jan. 22, 2020

(65) Prior Publication Data
US 2021/0224849 A1 Jul. 22, 2021

(51) Int. Cl.
*G06Q 30/02* (2012.01)
*G06N 20/00* (2019.01)

(52) U.S. Cl.
CPC ......... *G06Q 30/0255* (2013.01); *G06N 20/00* (2019.01); *G06Q 30/0254* (2013.01); *G06Q 30/0261* (2013.01); *G06Q 30/0269* (2013.01)

(58) Field of Classification Search
CPC .......... G06Q 30/0255; G06Q 30/0254; G06Q 30/0261; G06Q 30/0269; G06N 20/00
See application file for complete search history.

(56) References Cited

U.S. PATENT DOCUMENTS

| | | | |
|---|---|---|---|
| 9,439,036 B2 * | 9/2016 | Spears | H04L 67/306 |
| 10,068,251 B1 * | 9/2018 | Scofield | G06Q 30/0255 |
| 10,783,460 B1 * | 9/2020 | Davis | G06Q 10/025 |
| 10,909,553 B1 * | 2/2021 | Schulte | G06Q 30/0201 |

(Continued)

FOREIGN PATENT DOCUMENTS

| | | | |
|---|---|---|---|
| WO | 2019/013741 A1 | 1/2019 | |
| WO | WO-2019013741 A1 * | 1/2019 | ............ G06N 20/00 |

OTHER PUBLICATIONS

Y. Wang and S. Ram, "Predicting Location-Based Sequential Purchasing Events by Using Spatial, Temporal, and Social Patterns," in IEEE Intelligent Systems, vol. 30, No. 3, pp. 10-17, May-Jun. 2015, doi: 10.1109/MIS.2015.46. (Year: 2015).*

(Continued)

*Primary Examiner* — Marie P Brady
(74) *Attorney, Agent, or Firm* — Schwabe, Williamson & Wyatt, PC

(57) ABSTRACT

Embodiments include apparatuses, methods, and systems for segmenting a target region for a target user based on payment transactions within a payment processing system. The embodiments include identifying a target user from users based on payment transaction data, and determining target regions for the target user based on the payment transaction data of the target user and users. The target user may have a propensity for initiating transaction activity in the target regions within a predetermined time period. The embodiments include generating propensity scores for the target regions based on the payment transaction data, identifying a target region for the target user based on the propensity scores, and transmitting merchant offers to the target user based on the identified target region. The propensity scores may be ranked into a list of target region rankings, where the target region is a maximum score in the list of target region rankings.

16 Claims, 9 Drawing Sheets

(56) References Cited

U.S. PATENT DOCUMENTS

| | | | | |
|---|---|---|---|---|
| 2011/0264501 A1* | 10/2011 | Clyne | ............. | G06Q 30/02 |
| | | | | 705/14.25 |
| 2013/0046717 A1* | 2/2013 | Grigg | ............. | G06Q 30/02 |
| | | | | 706/46 |
| 2015/0046220 A1* | 2/2015 | Gerard | ........... | G06Q 30/0202 |
| | | | | 705/7.31 |
| 2015/0134244 A1* | 5/2015 | Hershey | ......... | G01C 21/3617 |
| | | | | 701/489 |
| 2017/0024799 A1* | 1/2017 | Bhatt | ............. | G06Q 30/0201 |
| 2019/0050833 A1* | 2/2019 | Hu | ............... | G06Q 20/10 |
| 2019/0287121 A1* | 9/2019 | Waksman | ....... | G06N 20/20 |
| 2020/0143269 A1* | 5/2020 | Cao | ............... | G06N 5/04 |

OTHER PUBLICATIONS

Xu et al, A Recommendation System Based On eXtreme Gradient Boosting Classifier, May 20, 2018, 10th International Conference on Modelling, Identification and Control (ICMIC, Jul. 2-4, 2018, p. 1-5. (Year: 2018).*

R. Keerthi and P. Lakshmi, "Predictive Analysis for Modeling Travel Decision Making," 2018 Second International Conference on Green Computing and Internet of Things (ICGCIoT), 2018, pp. 44-49, doi: 10.1109/ICGCIoT.2018.8753103. (Year: 2018).*

Gradient Boosting, Wikipedia, Jun. 15, 2021, p. 1-8. (Year: 2021).*

\* cited by examiner

TRAVEL DESTINATION PREDICTOR

BACKGROUND

Millions of transactions occur daily through the use of payment cards, such as credit cards, debit cards, prepaid cards, electronic wallet applications, etc. Corresponding records of the transactions are recorded in databases for settlement and financial record-keeping. Such data can be mined and analyzed for trends, statistics, and other analyses. Sometimes such data are mined for specific advertising goals, such as to provide targeted campaigns and/or offers to cardholders.

These payment cards allow users the flexibility to make purchases outside of the user's home country. Moreover, as the users travel to foreign countries and are away from their home country, the users' spending is oftentimes increased during the duration of the travel. For example, travelers often purchase meals, transportation, overnight accommodations, souvenirs, and items unintentionally left at home (e.g., clothing, toiletries, and/or the like) more frequently compared to when not traveling. Thus, overall, spending while traveling in a foreign country may be increased for many users, making benefits provided by portable financial device issuing institutions, transaction service providers, and/or merchants more useful to travelers.

However, to have targeted marketing campaigns pertaining to cross-border spending, one of the main challenges for these institutions, providers, and/or merchants is to accurately determine (or predict) a destination where a cardholder may travel to next. Although there are existing models to determine a timeframe when the cardholder may travel to next, such existing models may only determine who the cardholder is and/or when the cardholder may travel to next. The existing models, however, cannot help these institutions, providers, and/or merchants to promote existing or new targeted campaigns at the destination where the cardholder may travel to next.

Therefore, there is a need in the art for portable financial device issuing institutions, transaction service providers, and/or merchants to be able to accurately determine a user's propensity to make purchases in a foreign country using their portable financial device. Being able to determine this travel propensity allows the issuing institutions, transaction service providers, and/or merchants to have a more focused communication with the user and thus offer the user timely travel benefits and/or incentives before traveling to the destination and/or during the user's stay at the destination.

BRIEF DESCRIPTION OF SEVERAL VIEWS OF THE DRAWINGS

Embodiments described herein are illustrated by way of example and not limitations in the figures of the accompanying drawings, in which like references indicate similar features. Furthermore, some conventional details have been omitted so as not to obscure from the inventive embodiments described herein.

DETAILED DESCRIPTION

Figure 1:
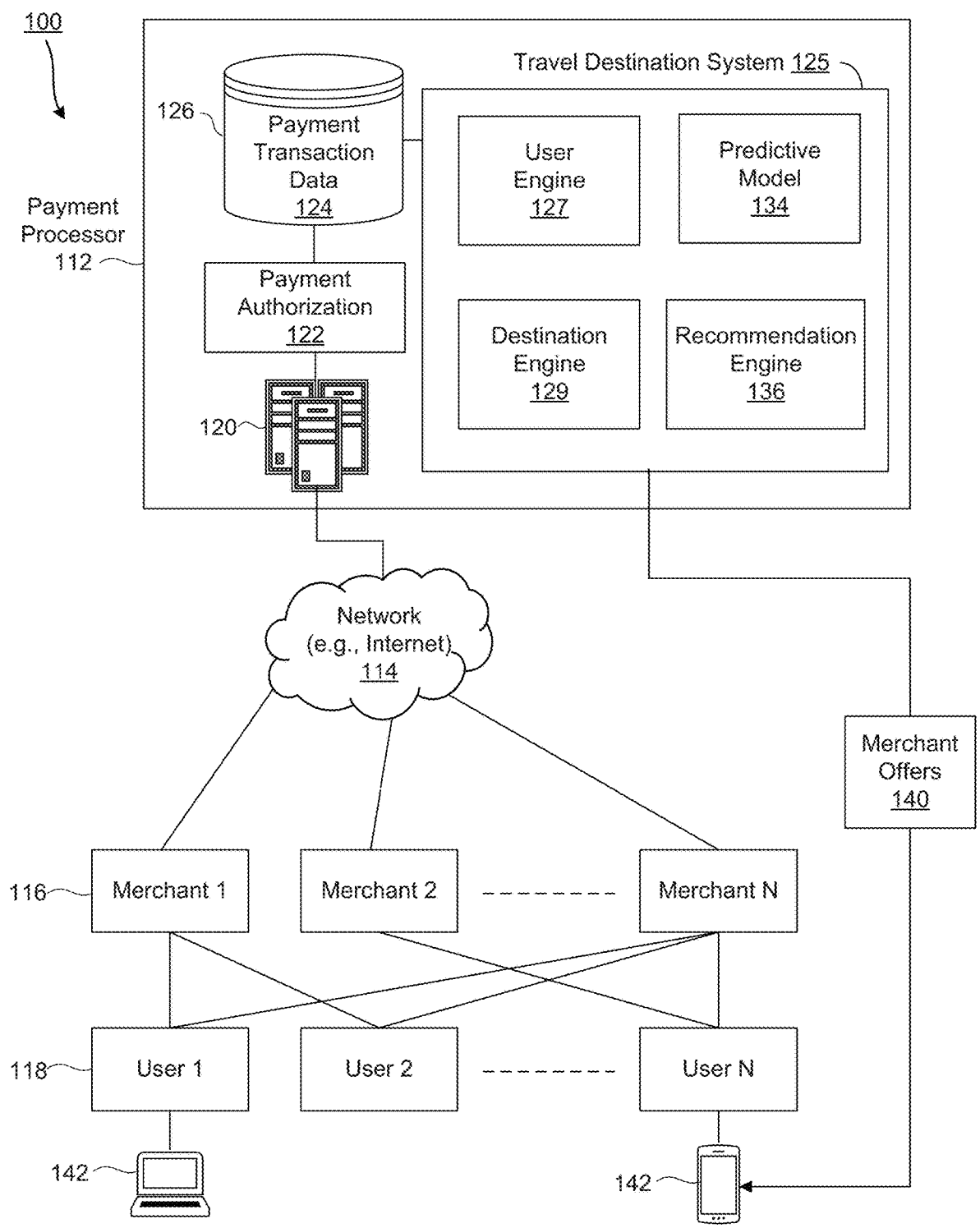
FIG. 1 is an illustration of a block diagram of an electronic payment processing system for segmenting a target user in a target region based on historical travel activity, according to some embodiments.

The embodiments described herein relate to segmenting users (e.g., cardholders) to predicted regions (or destinations) based on past travel activity data that enables issuers to proactively promote existing and/or new targeted campaigns (e.g., merchant offers) at the predicted regions. The following description is presented to enable one of ordinary skill in the art to make and use the invention and is provided in the context of a patent application and its requirements. Various modifications to the exemplary embodiments and the generic principles and features described herein will be readily apparent.

The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention.

The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

Issuers and card payment processors, are continuously seeking to provide cardholders with new services. One such service might be a travel destination prediction system using extensive user data available to the card payment processor. To do so, the travel destination prediction system identifies a targeted user having a high propensity to travel to a region within a timeframe (e.g., the upcoming 3 months) based on the targeted user's past traveling activities and/or patterns. The travel destination prediction system may thus help accurately predict the most likely travel region of the targeted user using a robust model that learns (or identifies) pre-travel behavior at a market level and deploys the learned pre-travel behavior to accurately predict at a card level. Accordingly, this service thus enables issuers to determine (or understand, predict, etc.) not only "when" the targeted user may travel to next, but also "where" the targeted user may travel to next, to promote existing and/or new campaigns at the predicted travel region prior to (and/or during) the targeted user traveling to such region.

Another service might be a merchant recommendation system using extensive user and merchant data available to the card payment processor. To do so, it is important to determine the targeted user's preference for merchants or spending categories pertaining to cross-border spending at the predicted travel region, so that identifying the targeted user having a high propensity to travel to the predicted travel region within the timeframe, the merchant recommendation system may effectively recommend focused merchants and merchant offers that the targeted/identified user would most likely visit and/or use during the cross-border spending. These services and many more implement extensive payment transaction data over time that enable the issuer (or the like) to observe patterns about users, merchants, and so on, to ultimately have focused communications and personalized campaigns with target users based on travel patterns for predicted target regions. These embodiments are described below in FIGS. 1-9 in further detail.

FIG. 1 is an illustration of a block diagram of a payment processing system 100 that may segment a target region for a target user based on historical travel activity, according to some embodiments. FIG. 1 is a block diagram of one embodiment of the payment processing system 100 (also referred to as a card payment processing system, an electronic card payment processing system, etc.) in which the disclosed embodiments may be implemented. The payment processing system 100 includes a payment processor 112 in communication (direct or indirect) over a network 114 with a plurality of merchants 116. A plurality of users 118 (or a plurality of cardholders) purchase goods and/or services from one or more of the merchants 116 using a portable financial device such as a payment card that may include, but is not limited to, a credit card, a debit card, a prepaid card, an electronic payment card, an electronic wallet, and/or the like.

For example, the portable financial device (or portable device) may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet application, a personal digital assistant, a pager, a security card, a computer, an access card, a wireless terminal, and/or a transponder. Additionally, the portable financial device may further include a volatile or a non-volatile memory to store information, including an account identifier, a name of a user of the users 118 (or a name of an account holder), and so on, and may initiate a transaction (or a portable financial device transaction) using the account identifier (or the like). Furthermore, as described herein, the merchants 116 may be a person or an entity that sells goods and/or services to the users 118 and any other consumers. For example, the merchants 116 may also be, but is not limited to, a manufacturer, a distributor, a retailer, a load agent, a drugstore, a grocery store, a gas station, a hardware store, a supermarket, a boutique, a restaurant, or a doctor's office. While, in another example in a business-to-business setting, one of the users 118 may be a second merchant 116 making a purchase from a first merchant 116.

Typically, the payment processor 112 provides the merchants 116 with a service, a device, and/or the like that allows the merchants 116 to accept the payment cards and also allows the merchants 116 to send payment details (or payment transaction details) back to the payment processor 112 over the network 114. In some embodiments, an acquiring bank, a processor, or the like (e.g., a transaction service provider, a transaction service provider processor, an issuing institution, an issuing institution processor, etc.) may forward the payment card details to the payment processor 112. Payment transactions may be performed using a variety of platforms such as brick and mortar stores, ecommerce stores, wireless terminals, and user mobile devices. The details of the payment transactions may be sent over the network 114 and received by one or more servers 120 of the payment processor 112. In addition, for some embodiments, the payment transaction details may be processed by a payment authorization process 122 (or the like) and/or may be forwarded to an issuing bank (or an issuing institution). The payment transaction details may also be stored as payment transaction data 124 (or payment transaction records) in a payment transaction database 126 (or a transaction service provider database). As is well-known, the servers 120 may include memory, processors, and/or the like for executing software components as described herein.

The payment transaction database 126 may be located at the payment processor 112 or elsewhere. Over time, the payment transaction database 126 may store historical transaction data (e.g., prior transaction data) and other information about the users 118 who use portable financial devices associated with the payment processor 112. For instance, the payment transaction database 126 may also store (or collect) various information regarding each of the users 118, including detailed information of each purchase transaction or non-purchase transaction (e.g., an automated teller machine transaction, an account funding transfer transaction, etc.) initiated by the user 118 with the portable financial device associated with the payment processor 112. This detailed information may then be stored as historical/past transaction data 124 for each of the users 118, which may be analyzed later by the payment processor 112.

In some embodiments, the payment transaction database 126 may include the payment transaction data 124 (or records/details) associated with the following spend categories of transaction data (or activity): the overall usage of the portable financial device, the overall usage of the portable financial device on travel and entertainment, the overall usage of the portable financial device on retail, the past cross-border behavior usage, and so on. These spend categories of transaction data may further include one or more transaction parameters (as described in further detail below).

In some embodiments, the transaction parameters of the spend/transaction categories may include: a frequency of transactions, a transaction spend, a consistency of usage, a frequency or amount of electronic commerce transactions, a frequency or amount of airline transactions, a frequency or amount of travel service transactions, a frequency or amount of lodging transactions, a frequency or amount of retail transactions, a frequency or amount of restaurant transactions, a frequency or amount of general retail transactions, a frequency or amount of apparel retail transactions, a frequency of transactions in the at least one target region, a transaction spend in the at least one target region, a consistency of transactions in the at least one target region, past travel behavior (or patterns), merchant preferences, an amount or frequency of seasonal purchases, a number of channels through which a user (e.g., the target user 118) has initiated a transaction, spend behavior, and/or any combination thereof. It will be appreciated that this list of spend categories (or transactions) of the transaction data, and/or the one or more transaction parameters within the spend categories of the transaction data may not be limited to the above list, and any relevant (or desired) transaction (or external) parameters may also be included.

The most basic and common type of payment transaction data is referred to as a level 1 transaction. The basic data fields of the level 1 transaction include, but are not limited to, merchant name, billing zip code, and transaction amount. Additional information of the payment transaction data, such as the date and time of the transaction, and additional user information may be automatically recorded (or collected/stored) at the payment transaction database 126, even if such information is not explicitly reported by the merchants 116 processing the payment transactions of the users 118. Meanwhile, a level 2 transaction may include the basic data fields of the level 1 transaction, and one or more other data fields generated automatically by an advanced point of payment system (or the like), where these other data fields may include, but are not limited to, sales tax amount, customer reference number/code, merchant zip/postal code tax id, merchant minority code, merchant state code, and so on.

In some embodiments, the payment processor 112 may further include a travel destination system 125 that may use the payment transaction data 124 of the payment transaction database 126. According to some embodiments, the travel destination system 125 may further include, but is not limited to, a user engine 127, a destination engine 129, a predictive model 134, and a recommendation engine 136. In some embodiments, the user engine 127, the destination engine 129, the predictive model 134, and/or the recommendation engine 136 may be implemented in software. In another embodiment, the user engine 127, the destination engine 129, the predictive model 134, and/or the recommendation engine 136 may be implemented in hardware, or a combination of hardware and software.

For some embodiments, the travel destination system 125 may segment (or determine/predict) a target region for a target user based on past travel activities of the users 118, where the target region may be a travel destination region 'where' the target user may most likely travel to within a predetermined time period (e.g., three months). The travel destination system 125 may then identify merchant offers for the target user based on the predicted target region.

As such, the travel destination system 125 may provide more targeted (or focused) communications between the users 118 (or the target users), the issuers, the transaction providers, and/or the merchants based on the predicted target regions of the target users 118. This ensures the issuers (or the transaction providers) may strategically campaign one or more return on investments (ROIs), such as personalized/focused merchant offers (or the like), for the card payments of the target users 118, and thus allows the issuers to transmit highly focused and campaigned ROIs via one or more personalized merchant offers 140 (or merchant recommendations) to the target users 118 before (and/or during) the predetermined time period time.

As shown in FIG. 1, the travel destination system 125 may mine the payment transaction database 126 to provide the personalized merchant offers 140 to the target users 118 based on the past payment transaction data 124 of the target users 118, the past preferences (or patterns) of the target user 118, the past payment transaction data 124 (and/or preferences) of the other users 118, and/or any other transaction data, such as past travel activity, of any of the users 118. In these embodiments, the travel destination system 125 may implement (i) the user engine 127 to identify a target user of the users 118 that may be traveling within the predetermined time period; (ii) the predictive model 134 to generate a propensity score (or a target variable) for a region (or corridor) of a plurality of regions (e.g., USA, UK, MENA, Europe, etc.) based on past transaction data (or past pre-travel activities, patterns, behaviors, etc.) of the target user (i.e., the propensity score may refer to a target user's propensity value (or percentage value) for initiating transaction activity in a specified region based on the learned past pre-travel patterns of the users 118); (iii) the destination engine 129 to predict (or segment/determine) a target region for the target user based on a maximum (or highest) score of a ranked list of regions that are generated by the propensity scores of the regions; and (iv) the recommendation engine 136 to identify one or more merchant offers in the target region for the target user, and then transmit one or more personalized merchant offers 140 in the target region for the target user.

As described herein, the travel destination system 125 may enable accurately predicting the target region (based on the destination engine 129) of the target user (based on the user engine 127) using the predictive model 134, where the predictive model 134 may be implemented with one or more complex machine learning algorithms (e.g., Salford Systems' gradient boosting models/machines (GBM) techniques (or the like)). In these embodiments, the predictive model 134 may implement the complex machine learning algorithms to actively learn from past payment transaction data 124, past travel activity (or past training data), and/or past patterns of pre-travel behavior (or transactions) of the target/other users 118 at a market level, and to subsequently deploy (or compute) all of these learnings to accurately predict the target region of the target user at a card level.

Accordingly, the predictive model 134 may (i) learn from historical travel activity of the users 118 at a market level (e.g., such activity may include at least past pre-travel transaction behaviors, patterns, and data of the users 118, and past pre-travel transaction behaviors, patterns, and data of a target user); (ii) compute (or deploy/generate) a propensity score for a plurality of regions based on the learned historical travel activity of the target user and/or the users 118; and (iii) thus predict (or determine/segment) a target region for the target user based on the computed and ranked propensity scores of the regions (i.e., the target region may be predicted based on the region with the highest (or max) propensity score).

In some embodiments, the predictive model 134 may deploy a GBM (or a multi-class model (or the like)) on the data pipelines of the users 118 to predict a target region for a target user based on past and relevant learned patterns of travelers (and/or users 118), where the data pipelines may include training data, travel activity, and/or a plurality of features based on payment transaction data 124 pertaining to the demographics, spend patterns, and/or spend categories of the users 118.

The GBM may generate (or create) a model having a structured set of trees to predict the target region for the target user. For example, the GBM may create a first tree (or a first tree structure) grown on an original target (or an initial target region), and then creates a second tree grown on the residuals from the first tree. The predictive model 134 may thus implement the GBM to provide computed travel destination predictions that substantially improve from the first tree to the second tree and so on (e.g., the GBM may create and compute 500 trees of predictions, or any desired number ($N^{th}$) trees of predictions). Accordingly, the predictive model 134 may compute GBM scores for all of the selected features and subsequently provide a consolidated (or overall) score at a target level (i.e., the propensity score for every region/corridor at the target level). Note that, in some embodiments, the predictive model 134 may deploy the GBM (or the multi class models) on substantially real-time dataflow through the cloud (or the like).

As described above, the predictive model 134 may be a machine learning algorithm comprised of one or more algorithms (e.g., the first algorithm, the second algorithm, and so on), where the machine learning algorithm may be configured to implement the payment transaction data 124 for the users 118. The machine learning algorithm may be any machine learning algorithm capable of making the predictive model 134 more accurate over time based on past transaction data (e.g., pre-travel activity), a plurality of transaction parameters, and/or one or more external parameters. In some embodiments, the machine learning algorithm of the predictive model 134 may be comprised of a machine learning GBM, such as a TreeNet GBM.

Likewise, as described above, the user engine 127 may be used to identify and segment one or more target users of the users 118 based on the spend patterns of the payment transaction data 124 of the one or more target users. The user engine 127 may also be used to create a modeling population of target users (i.e., a model based on the target users identified from the users 118 that may have a high propensity to travel within a predetermined time period such as in the next three months), and to identify a plurality of target regions (or a plurality of likely target regions) for the target users based on the modeling population.

The user engine 127 may implement the modeling population to ascertain (or identify) the target user(s) from the cards payments of the users 118 with a high propensity to travel to one or more likely target regions in the predetermined time period, where the modeling population may be split into learning datasets, validation datasets, and/or any other ascertained datasets. Additionally, the modeling population of target users may be used to identify the one or more likely/possible target regions where the target users may have initiated cross-border transactions in these identified (or likely) target regions. As such, according to some embodiments, the user engine 127 may be used (i) to identify that the top 7 target regions comprised of MENA, USA, UK, EU, SEA, CIS, and Sub-continents may account for approximately 90% of the target users (or the cardholders) that are most-likely traveling; and (ii) to also identify that approximately 83% of the target users may only travel to one of the top 7 target regions during the predetermined time period.

Meanwhile, in connection with the user engine 127 and/or the predictive model 134, the destination engine 129 may be used to ultimately predict the target region that the target user may most-likely travel to during the upcoming predetermined time period. In some embodiments, the destination engine 129 may utilize the GBM propensity scores generated by the predictive model 134 to finally predict a particular target region for a particular target user. For example, each of the propensity scores of the identified target users may be ranked relative to one another for every possible identified target region based at least (or partially) on historical traveling activity, prior transaction data, transaction parameters, external parameters, and/or the like. In some embodiments, the destination engine 129 may thus use the ranked target users and the ranked propensity scores to accurately and finally predict the particular target region for the particular target user from, for example, the top 10% of the target users or any other top desired percentage of the target users, such as the top 15%, top 20%, top 25%, top 30%, top 33%, top 35%, top 40%, top 45%, top 50%, and/or the like. It will be appreciated that any percentage of the target users may be used (or selected) to predict the particular target region and to identify the particular target user(s).

Lastly, as described above, the recommendation engine 136 may be used to identify (or campaign) one or more merchant offers that are applicable to (or focused on) the particular target region for the particular target user. Additionally, after identifying the one or more applicable merchant offers, the recommendation engine 136 may then transmit the personalized merchant offers 140 to the particular target user (i) prior to traveling to the particular target region and/or (ii) during the target user's stay at the particular target region. For example, the recommendation engine 136 may recommend (or transmit/push) the personalized merchant offers 140 to the target user 118 based on a market basket analysis (MBA) model (or MBA techniques) that may identify the next likely spend transactions and/or categories for the target user in the particular target region, where the identified next likely spend transactions and/or categories may thus be used to personalize (or strategically identify) the top/best merchant offers that are available to the target user in the particular target region based on the target user's spending transactions/categories. Moreover, in some embodiments, the recommendation engine 136 may identify the top merchant offers and transmit the personalized merchant offers 140 to the target user based on one or more profile parameters of the card payments such as target regions, card percentages, top association categories, available merchant offers, and so on. For example, the personalized merchant offers 140 may recommend (or offer/campaign) an offer of 10% off international shoppers' vouchers, an offer of 5% off when you spend next on the duty free stores, and so on.

Note that, as described herein, the recommendation engine 136 may be implemented to transmit and recommend any type of offer (e.g., discounts, vouchers, free incentives, or the like) for any type of merchant (e.g., shops, stores, hotels, restaurants, or the like). In one embodiment, the recommendation engine 136 may transmit the personalized merchant offers 140 to the target user 118 through a payment card application (or the like) implemented on a user device 142 of the target user 118, where the user device 142 may be a smartphone, a laptop, a tablet, or the like. Alternatively, in other embodiments, the target user 118 may interact with the travel destination system 125 through a conventional web browser or the like.

Although the user engine 127, the destination engine 129, the predictive model 134, and the recommendation engine 136 are shown as separate components, the functionality of each component may be combined into a lesser or greater number of modules/components. In addition, although the servers 120 are shown hosting the user engine 127, the destination engine 129, the predictive model 134, and the recommendation engine 136, each of these components may run on any type of one more computers (or servers) that may have memory, processor, and so on.

Furthermore, both the servers 120 and the user devices 142 may include hardware components of typical computing devices (not shown), including a processor, input devices (e.g., keyboard, pointing device, microphone for voice commands, buttons, touchscreen, etc.), and output devices (e.g., a display device, speakers, and the like). The servers 120 and the user devices 142 may also include computer-readable media, for example, memory and storage devices (e.g., flash memory, hard drive, optical disk drive, magnetic disk drive, and the like) containing computer instructions that implement the functionality described herein when executed by the payment processor 112. The servers 120 and the user devices 142 may further include wired or wireless network communication interfaces for communication.

Although the servers 120 are shown as several computers, it should be understood that the functions of the servers 120 may be distributed over a single server or one or more servers, and that the functionality of software components may be implemented using any different number of software components. For example, the predictive model 134 (or any other component such as the user engine 127, the destination engine 129, and/or the recommendation engine 136) may be implemented as more than one component. That is, in an alternative embodiment, the user engine 127, the destination engine 129, the predictive model 134, and the recommendation engine 136 may be implemented as one or more virtual entities whose functions are distributed over one or more of the user devices 142 of the users 118.

Note that the payment processing system 100 may include fewer or additional components and processing steps based on the desired processing design.

Figure 2:
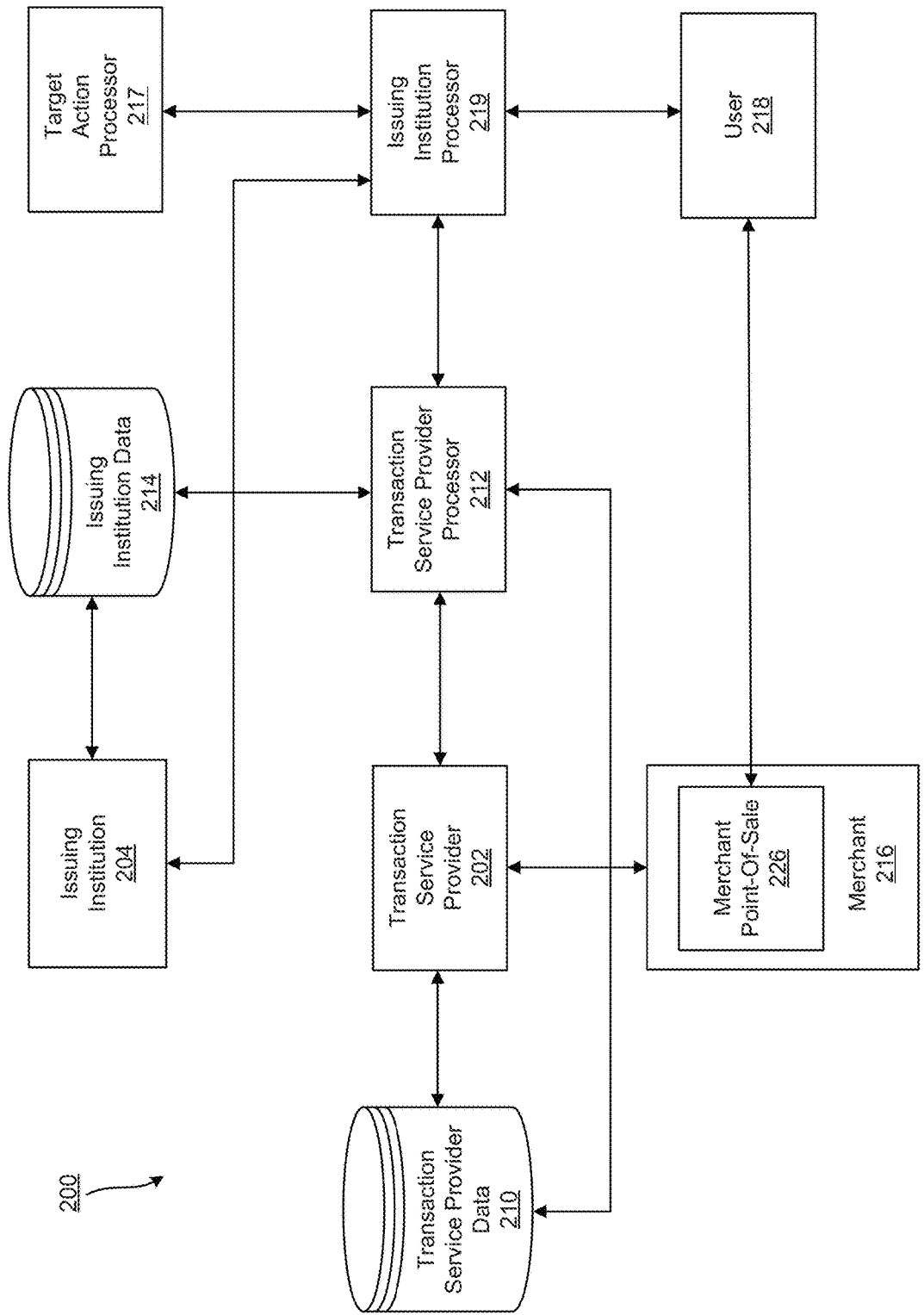
FIG. 2 is an illustration of a block diagram of a travel destination system for segmenting a target user in a target region based on historical travel activity, according to some embodiments.

FIG. 2 is an illustration of a block diagram of a payment processing system 200 that may segment a target region for a target user based on past travel activity, according to some embodiments. Additionally, the payment processing system 200 may be substantially similar to the payment processing system 100 described above in FIG. 1. That is, in these embodiments, the payment processing system 200 may include one or more components that are substantially similar to the respective components of the payment processing system 100 described above in FIG. 1. For example, the payment processing system 200 may include, but is not limited to, a payment processor, a travel destination system, a user engine, a destination engine, a predictive model, and/or a recommendation engine that are substantially similar to the payment processor 112, the travel destination system 125, the user engine 127, the destination engine 129, the predictive model 134, and/or the recommendation engine 136 of the payment processing system 100 described above in FIG. 1.

Referring now to FIG. 2, the payment processing system 200 may include, but is not limited to, a transaction service provider 202, an issuing institution 204, a transaction service provider data 210, an issuing institution data 214, a transaction service provider processor 212, a merchant 216, a target action processor 217, a user 218, an issuing institution processor 219, and a merchant point-of-sale (POS) 226, according to some embodiments. For some embodiments, the payment processing system 200 may be implemented to predict a target region for a target user in a predetermined time period based on past travel activities of users (as described above).

For example, the components, the methods, and the process flows described above/herein may be operated by (or on behalf of) the payment processing system 200.

Additionally, note that some functions, techniques, and operations may be described as being performed by (or caused by) software applications (or instructions, code, etc.) to simplify description. That is, the techniques described herein may be carried out with a computer system, such as the payment processing systems 100 and 200 of FIGS. 1 and 2 (or with any other processing systems described herein), in response to its processors executing the sequences of instructions contained in its memory (or the like).

Accordingly, the payment processing system 200 may be implemented as a travel destination system (e.g., the travel destination 125 of FIG. 1) that allows predicting the target region (e.g., via the destination engine 129 of FIG. 1) of the target user (e.g., via the user engine 127 of FIG. 1) based on the predictive model (e.g., the predictive model 134 of FIG. 1). For some embodiments, the payment processing system 200 may include a transaction service provider 202 that may receive transaction authorization requests from one or more merchants 216 (or any other entities), and that may subsequently provide guarantees of payment to the merchants 216, in some cases through an agreement between the transaction service provider 202 and an issuing institution 204.

For example, the issuing institution 204 (or the issuing bank, the issuer, the issuer bank, the portable financial device issuer, etc.) may be implemented to provide one or more accounts to a customer such as the user 218, the merchant 216, or the like, where the accounts may be used to conduct the payment transactions for the customer, such as initiating credit and/or debit payments. Additionally, in another example, the issuing institution 214 may provide one or more account identifiers, such as a personal account number (PAN), to the customer that uniquely identifies the accounts associated with the customer. The account identifier may be physically embodied on the portable financial device such as a physical financial instrument (e.g., a payment card, a debit card, etc.). Additionally, the account identifier may be electronically embodied/associated with the portable financial device and/or may be used for electronic payments.

The issuing institution 204 may also be associated with a bank identification number (BIN) that uniquely identifies the respective issuing institution/bank. The issuing institution 204 may be implemented with one or more computer systems operated by (or on behalf of) the respective issuing institution 204, where the computer systems may include one or more processors, servers, or the like, that may execute the one or more software applications (or instructions) described herein. In another embodiment, the issuing institution 204 may include one or more authorization servers that are used to receive authorization requests sent by the merchant POS 226, and/or to approve (or authorize/validate) such authorization requests for the payment transactions initiated by the user 218.

In one embodiment, the user 218 may be a holder of a portable financial device associated with the transaction service provider 202, where the user 218 may be an account holder, a cardholder, or the like. In another embodiment, the user 218 may be a holder of a portable financial device issued by the issuing institution 204. Additionally, in these embodiments, the user 218 may purchase goods and/or services from the merchant 217, and may then use the portable financial device to initiate a financial transaction with the merchant 216 using the merchant POS 226, where the merchant POS 226 may subsequently communicate with the transaction service provider 202 to receive, authorize (or accept/decline), and complete (or guarantee) the payment of the financial transaction. Moreover, in some embodiments, the user 218 may be identified as a target user (or one of the target users) by one or more of the transaction service provider 202, the issuing institution 204, and the merchant 216 of the payment processing system 200. As such, the user 218 may receive one or more personalized merchant offers based on the target region that the user 218 is predicted to travel to in the upcoming predetermined time period, and the past transaction activities of the user 218 and other users (or travelers).

In these embodiments, the merchant 218 may be an individual, an entity, or the like, that provides goods and/or services, or access to goods and/or services, to the user 218 based on a transaction, such as a payment transaction. For example, the merchant 218 may be implemented with one or more computer systems (or processors, servers, etc.) operated by (or on behalf of) the respective merchant 218, where the computer systems may include processors, servers, or the like, that may execute the one or more software applications (or instructions) described herein.

Likewise, the merchant POS 226 may be implemented with one or more computers and/or peripheral devices that are associated with (or operated by) the respective merchant 216, and that allow the merchant 216 to engage in payment transactions with the user 218. For example, the computers and/or peripheral devices of the merchant POS 226 may include, but are not limited to, one or more card readers, near-field communication (NFC) receivers, RFID receivers, and/or any other contactless transceivers or receivers, contact-based receivers, payment terminals, computers, servers, input devices, any other similar devices that may be used to initiate payment transactions by the user 218, and/or any other device (or instrument) that may be used to send authorization requests to the target service provider 202 and/or the issuing institution 204 for the authorization of the payment transactions initiated by the user 218. Note that, in some embodiment, the merchant POS 226 may include one or more server computers that may be programmed (or configured) to process online payment transactions through webpages, mobile applications, and/or the like.

Continuing with FIG. 2, the user 218 may reside in a region (or a first region). As used herein, the term "reside" may refer that the user 218 is a citizen, a permanent resident, or a non-permanent resident in the region. The user 218 may live at an address in the region and may have a user account(s) that may be associated with that address. The user account may be associated with an address, a residence, or a place of business. The user 218 may be the holder of the portable financial device located in (or associated with) the region. For example, the user's 218 mailing address and/or billing address may be located in the region, where the region may be any definable geographic region. In some embodiments, the region may be defined as a neighborhood, a township, a town, a municipality, a borough, a city, a district, a county, a parish, a state, a commonwealth, a province, a territory, a colony, a country, a continent, a hemisphere, and/or some collection or combination thereof. The region may also be any other arbitrarily defined geographical area, as determined (or identified) by the transaction service provider 202 or the issuing institution 204. Accordingly, at least one target region (or a second region) may be defined as an area geographically outside of (external to) the region (or the first region). In some embodiments, the region may be a specific first country associated with a user account of the user 218, and the target region may be every other country except the first country. For example, the region may be identified as the USA, while the target region may be identified as all other countries. In some embodiments, the region may be a specific first state, and the target region may be every other state except the first state, as well as every other country, such as the region being Pennsylvania and the target region being all other states in the USA, as well as every other country. In other examples, the target region may be a subset of regions external to the region.

In some embodiments, the merchant 216 selling goods and/or services to the user 218 may be a domestic merchant or a foreign merchant. For example, the domestic merchant may indicate that the merchant 216 may be located in or initiating a transaction in the region associated with the user 218. Meanwhile, the foreign merchant may indicate that the merchant 216 may be located in or initiating a transaction in one or more target regions associated with the user 218. Whether the merchant 216 is a domestic merchant or a foreign merchant may depend on the location at which the respective transaction between the user 218 and the merchant 216 is considered to be taking place. For example, a transaction may be considered to be taking place at a brick-and-mortar location (whether it be in the region or the target region that may be associated with the user 218) of the merchant 216 when/if the user 218 is physically present in the brick-and-mortar location to initiate the transaction, and/or the user 218 may be physically present in the brick-and-mortar location to initiate the transaction during an upcoming predetermined time period (e.g., in the next 3 months). For another example, a transaction may be considered to take place in the region of the user 218 when the transaction is initiated online and billed and/or shipped to the address of the user 218 in the region. Note that any other relevant transaction scenarios may be considered when determining the location(s) of the transaction.

Continuing with the embodiments shown in FIG. 2, during the financial transactions between the user 218 and the merchant 216, the merchant POS 226 communicates with the transaction service provider 202. During these transactions, the transaction service provider 202 may collect transaction data (e.g., similar to the payment transaction data 124 of FIG. 1) relating to the financial transactions between the user 218 and the merchant 216. The transaction service provider 202 may communicate (or store) that collected transaction data to a transaction service provider database 210 (e.g., similar to the payment transaction database 126 of FIG. 1).

The transaction service provider database 210 may be located at the transaction service provider 202 or elsewhere. Over time, the transaction service provider database 210 may store such historical/past transaction data (e.g., past travel activity, behaviors, patterns, etc.) and any other information relating to the user 218, the merchant 216, and/or any other user and merchant who may use the portable financial devices associated with the transaction service provider 202. For example, the transaction service provider 202 may collect various information related to the user 218 and each of its account holders, including information relating to each purchase or each non-purchase transaction (e.g., an automated teller machine transaction, an account funding transfer transaction, etc.) that each of the account holders has made using the portable financial device associated with the transaction service provider 202. This past transaction data may be analyzed (or mined) later by the transaction service provider 202. For example, as described above, the payment processing system 200 may use this past transaction data (i) to predict the target region (or the second region) where the target user's 218 payment card may most-likely be used in the predetermined time period, and (ii) to further allow the transaction service provider 202, the issuing institution 204, and/or the merchant 215 to identify the predicted target region of the target user 218, and to initiate (or campaign) more focused communications, such as personalized merchant offers, with the target user 218 based on the target region and so on.

Additionally, another category of the transaction data that may be used by the payment processing system 200 may include external factors, which may not be stored in the transaction service provider database 210. The external factors category may include one or more external transaction parameters, such as, but are not limited to, a change in currency exchange (such as exchange rate), a holiday or event schedule in at least one of the region and the at least one target region, a time of year, and/or any combination thereof. These external transactions parameters may be predetermined and/or obtained from one or more third party sources, such as government databases.

Continuing now with the embodiments shown in FIG. 2, the payment processing system 200 may further include the transaction service provider processor 212 owned and/or controlled by (or on behalf of) the transaction service provider 202. The transaction service provider processor 212 may be located at the transaction service provider 202 or elsewhere. The transaction service provider database 210 may be in communication with the transaction service provider 202 and/or the transaction service provider processor 212. In some embodiments, the transaction service provider processor 212 may be a separate computer system or, in other examples, may be part of the transaction service provider 202.

The transaction service provider processor 212 may also be in communication with an issuing institution database 214, where the issuing institution database 214, similar to the transaction service provider database 210, may include information about each customer such as the user 218, the merchant 216, and/or any other user that is associated with the issuing institution 204. The issuing institution database 214 may be located at the issuing institution 204 or elsewhere. The issuing institution database 214 may include information about the user 218 and any other user that is collected by the issuing institution 204. In some embodiments, the issuing institution database 214 may include, but is not limited to, the following information: personal information (e.g., name, age, gender, mailing address, phone number, email address, social security number, driver's license number, marital status, occupation, and/or the like), and/or various financial information (e.g., credit score, credit score history, bank account number, account identifier, monthly salary, yearly salary, and/or the like). Note that some of the information stored (or collected) in the transaction service provider database 210 and the issuing institution database 214 may be duplicative.

In some embodiments, in response to predicting (or segmenting) the target user 218, the payment processing system 200 may implement the transaction service provider processor 212 (and/or the transaction service provider 202) to automatically initiate at least one target action related to the target region (e.g., a personalized merchant offer based on the target region) by communicating with the target user 218 and/or some group of target users.

As described above, the personalized offer may be any benefit (or ROI), such as a discount, a coupon, a cash back, a promotional item, a sweepstakes, and/or any other incentive transmitted (or pushed) to the target user 218, where such benefits and/or incentives may be particularly focused on the target region where the target user 218 is predicted to travel to in the predetermined time period. For example, the personalized merchant offer may be related to pre-travel behavior, travel, and entertainment that may be particularly focused and/or located in the target region, such as an offer for typical travel products and/or services provided by the merchant 216, and/or an offer for products and/or services typical for use or purchase in the target region. The personalized merchant offers that are communicated to the target user 218 may also be informational or associated with incentivizing the target user 218 to use the portable financial device(s) in connection with travel (or prior to travel) in the target region. Additionally, the issuing institution processor 219, and/or the target action processor 217 may communicate similar target actions to the target user 218 using like communication methods.

For example, as shown in FIG. 2, the issuing institution processor 219 may be implemented to initiate at least one target action based on the target region, the target user 218, and/or a communication from the transaction service provider processor 212. In some embodiments, the issuing institution processor 219 may communicate the one or more target actions with the issuing institution 204, the issuing institution database 214, and/or the target action processor 217. For example, the transaction service provider processor 212 may communicate data to the issuing institution processor 219 that may therefore process that data. The issuing institution database 214 may be hosted by (or on behalf of) the issuing institution 204. In some embodiments, the issuing institution processor 219 may generate a list of target users associated with the issuing institution 204, and may communicate the list(s) of target users to one or more entities such as the issuing institution 204, the issuing institution database 214, the transaction service provider 202, the transaction service provider processor 212, and/or the transaction service processor 217. The list(s) may be used by one or more of these entities of the payment processing system 200 to, in turn, provide the target users with one or more personalized merchant offers based on one or more predicted target regions for each of the target users, or for other purposes, such as approving the target user 218 for a transaction in the target region and/or any other region related or having a connection to the target region.

Moreover, in some embodiments, the issuing institution processor 219 may initiate at least one target action by transmitting a signal to the target action processor 217. The target action processor 217 may be a separate computer system or, in other examples, may be a part of the issuing institution processor 219 and/or the transaction service provider processor 212. The target action may include any number of actions directed to informing (or notifying) the issuing institution processor 219 and/or the transaction service provider processor 212 to increase their campaigning of ROIs (or offers) using more focused communications with the target user 218 and other target users that have been associated with respective target regions. The target action may also include any number of actions directed to incentivizing, educating, or encouraging the target user 218 and/or the other target users to use their portable financial device in their respective target region prior to or during travel. Meanwhile, in another embodiment, the target action may also include automatically approving the target user 218 for transactions in the at least one target region.

Note that the payment processing system 200 may include fewer or additional components and processing steps based on the desired processing design.

Figure 3:
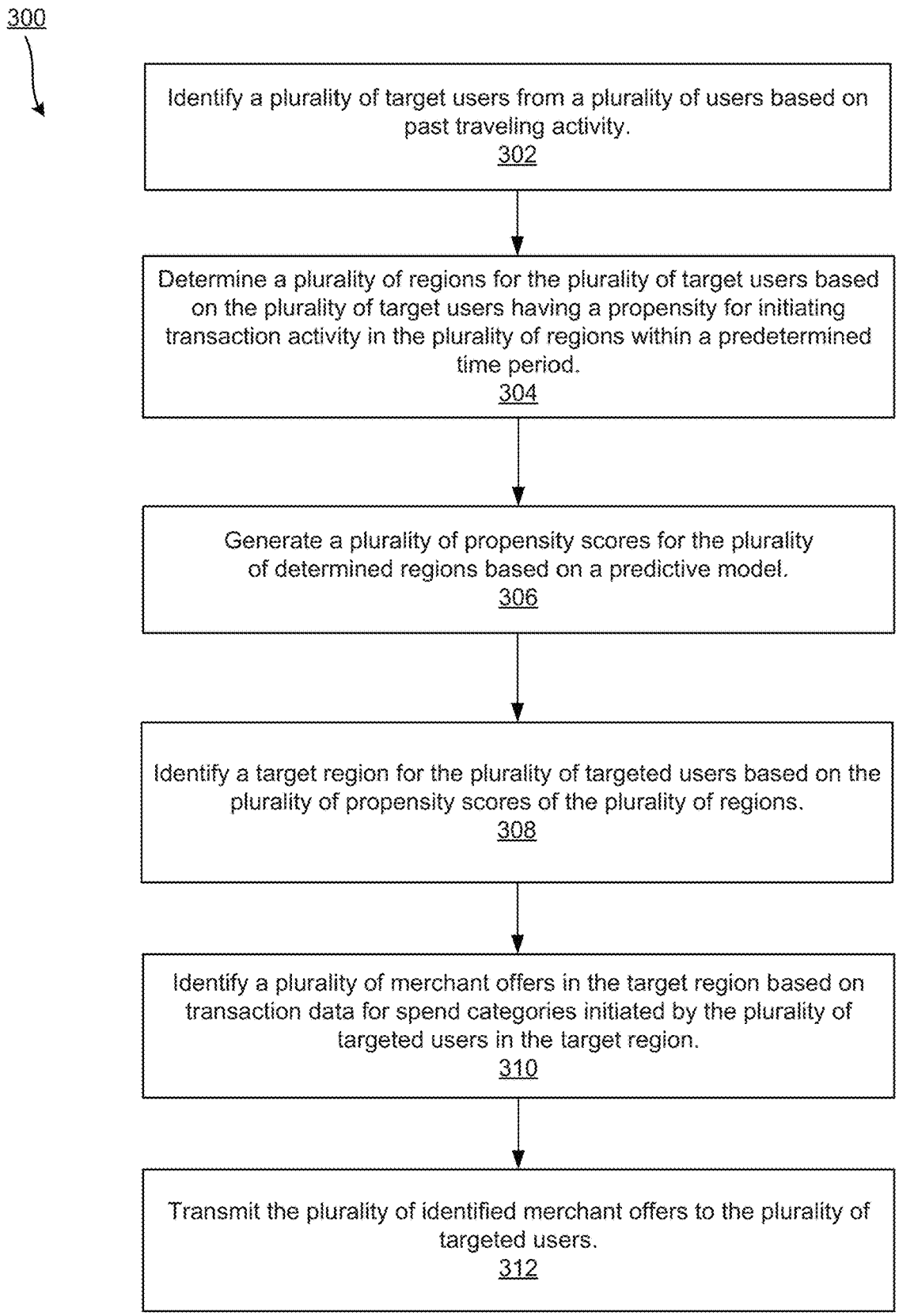
FIG. 3 is an illustration of a flow diagram of an electronic payment processing system for segmenting a target user in a target region based on historical travel activity, according to some embodiments.

FIG. 3 is an illustration of a process flow diagram 300 of a method for segmenting and predicting a target region for a target user based on payment transaction data, according to some embodiments. The process flow diagram 300 may be implemented by one or more processors, when configured by the components of the travel destination payment system 125 of FIG. 1 stored in computer-readable memory (or the like) of the servers and/or other computers. Additionally, the process flow 300 may be implemented by processing logic which may be implemented in software, firmware, hardware, or any combination thereof.

According to some embodiments, as described above, the process flow 300 may be implemented to segment (or identify) a target user in a plurality of target users (or any other users) based on historical payment transaction data, (i) where the target user may be traveling to a target region from a plurality of regions (or target regions), and (ii) where the target region may be a predicted travel destination that may be visited (or traveled to) by the target user in a predetermined time period. As such, the process flow 300 described herein may be configured to execute the method for segmenting and accurately predicting the target region for the target user based on the payment transaction data, predictive models, and so on, according to some embodiments.

Accordingly, for these embodiments, the process flow 300 may be implemented using a predictive model, such as an actively learning model (or the like) that is associated with one or more complex machine learning algorithms using Salford Systems' GBM techniques. Furthermore, as described above, this predictive model may be implemented: (i) to actively learn and be populated with past pre-travel activities (or patterns) associated with a target user, a plurality of target users, and/or any other users at the market level, (ii) to compute a plurality of propensity scores for a plurality of target regions based on the target user, the plurality of target users, and/or any other users having a propensity for initiating transaction activity in the plurality of target regions within a predetermined time period, and (iii) to therefore predict (or identify/select/segment) a target region in plurality of target regions for the target user by generating a ranked list of the propensity scores, and then selecting the maximum (or highest) propensity score in the ranked list with its associated target region being used as the ultimate predicted target region for the target user. An example of such process flow (or method) is further described below in accordance to one or more embodiments described herein.

At 302, a payment processor, such as the payment processor 112 of FIG. 1, may identify a plurality of target users from a plurality of users based on past traveling activity, according to an embodiment. At 304, the payment processor may determine a plurality of regions for the plurality of target users based on the plurality of target users having a propensity for initiating transaction activity in the plurality of regions within a predetermined time period, according to an embodiment.

At 306, the payment processor may generate a plurality of propensity scores for the plurality of determined regions based on a predictive model, according to an embodiment. At 308, the payment processor may identify a target region for the plurality of targeted users based on the plurality of propensity scores of the plurality of regions, according to an embodiment.

At 310, the payment processor may identify a plurality of merchant offers in the target region based on transaction data for spend categories initiated by the plurality of targeted users in the target region, according to an embodiment. At 312, the payment processor may transmit the plurality of identified merchant offers to the plurality of targeted users, according to an embodiment.

Note that the process flow 300 may include fewer or additional components and processing steps based on the desired processing design.

Figure 4:
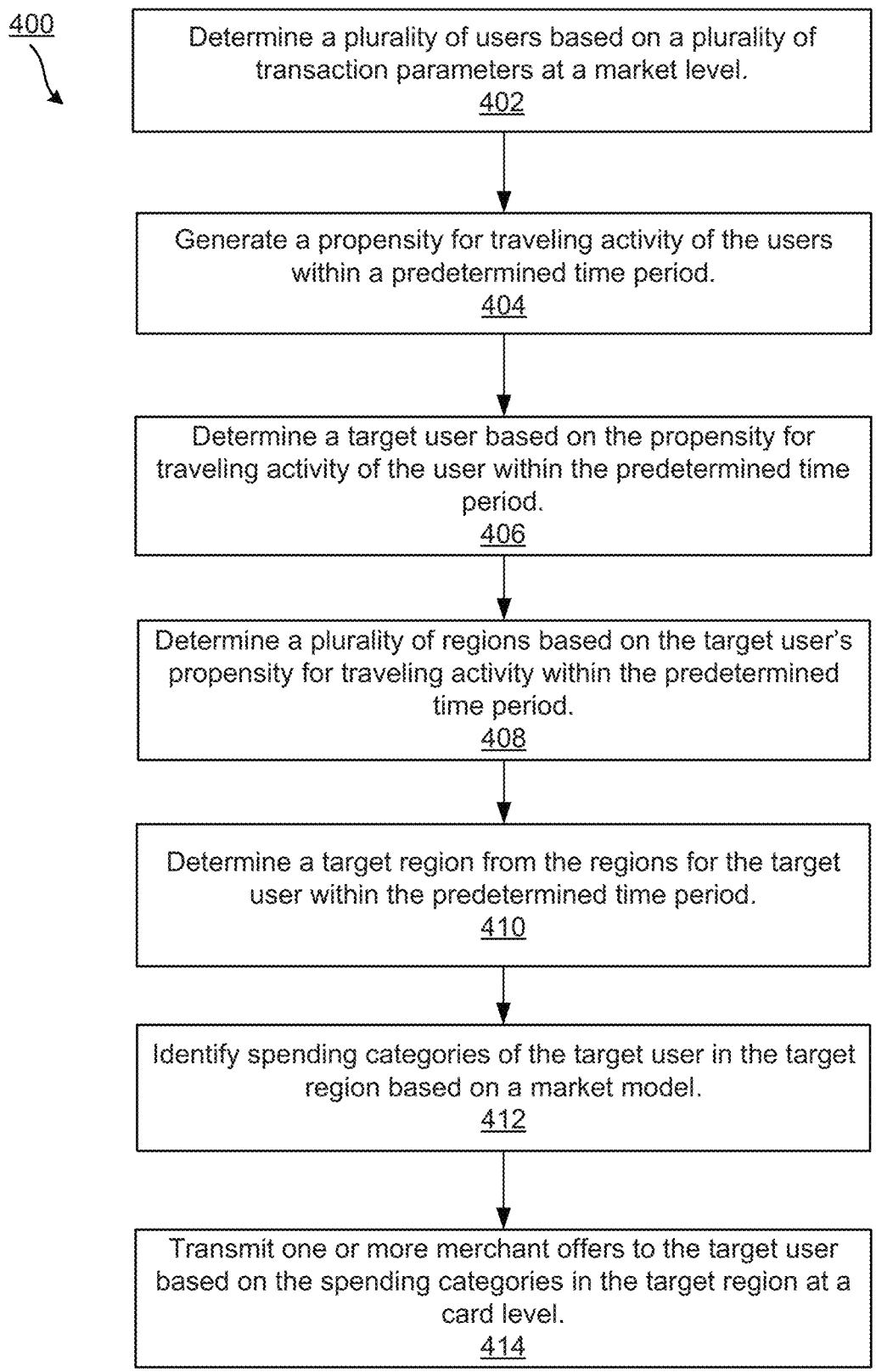
FIG. 4 is an illustration of a flow diagram of an electronic payment processing system for segmenting a target user in a target region based on historical travel activity, according to some embodiments.

FIG. 4 is an illustration of a process flow diagram 400 of a method for segmenting and predicting a target region for a target user based on payment transaction data, according to a second embodiment. The process flow 400 may be similar to the process flow 300 described above in FIG. 3. The process flow diagram 400 may be implemented by one or more processors, when configured by the components of the travel destination payment system 125 of FIG. 1 stored in computer-readable memory (or the like) of the servers and/or other computers. Additionally, the process flow diagram 400 may be implemented by processing logic which may be implemented in software, firmware, hardware, or any combination thereof.

Additionally, according to some embodiments, the process flow 400 may be implemented similarly to the process flow 300 described above in FIG. 3. As such, the process flow 400 described herein may be configured to execute the method for segmenting and accurately predicting the target region for the target user based on the payment transaction data, predictive models, and so on, according to some embodiments. Likewise, in some embodiments, the process flow 400 may be implemented using a predictive model, such as an actively learning model (or the like) that is associated with one or more complex machine learning algorithms using Salford Systems' GBM techniques. An example of such process flow (or method) is further described below in accordance to one or more embodiments described herein.

At 402, a payment processor, such as the payment processor 112 of FIG. 1, may determine a plurality of users based on a plurality of transaction parameters at a market level, according to an embodiment. At 404, the payment processor may generate a propensity for traveling activity of the users within a predetermined time period, according to an embodiment. At 406, the payment processor may determine a target user based on the propensity for traveling activity of the user within the predetermined time period, according to an embodiment. At 408, the payment processor may determine a plurality of regions based on the target user's propensity for traveling activity within the predetermined time period, according to an embodiment.

At 410, the payment processor may determine a target region from the regions for the target user within the predetermined time period, according to an embodiment. At 412, the payment processor may identify spending categories of the target user in the target region based on a market model, according to an embodiment. At 414, the payment processor may transmit one or more merchant offers to the target user based on the spending categories in the target region at a card level, according to an embodiment.

Note that the process flow 400 may include fewer or additional components and processing steps based on the desired processing design.

Figure 5:
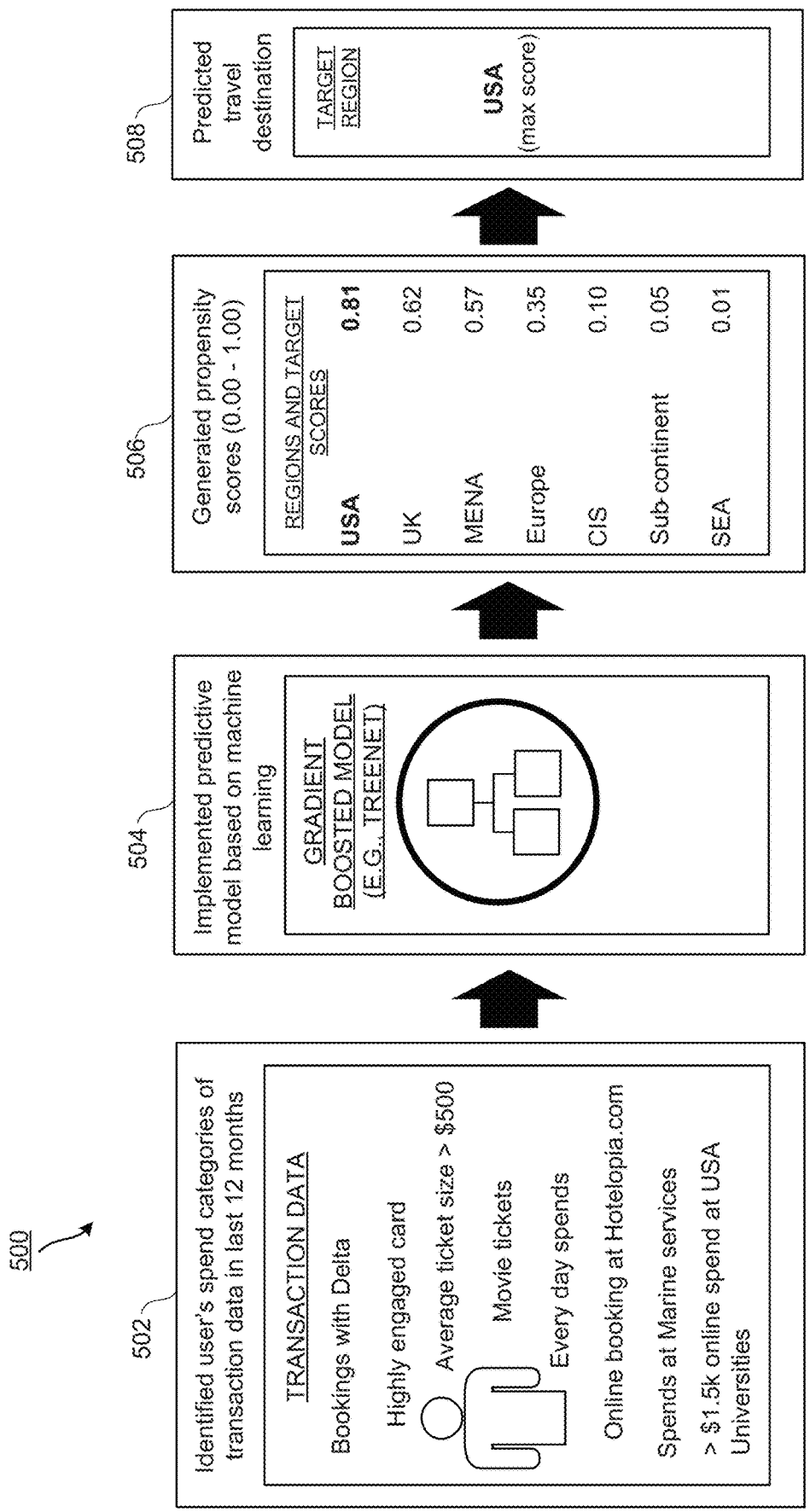
FIG. 5 is an illustration of a block diagram of a travel destination system for segmenting a target user in a target region based on historical travel activity, according to some embodiments.

FIG. 5 is an illustration of a simplified block diagram of a travel destination system 500 for predicting a target region for a target user based on historical travel activity, according to some embodiments. The travel destination system 500 may be substantially similar to—and implemented similarly to—the travel destination system 125 described above in FIG. 1. As such, in some embodiments, the travel destination system 500 may be configured (or implemented) with one or more components 502, 504, 506, and 508, where the components 502, 504, 506, and 508 may act and/or be used similar to the one or more respective components of the travel destination system 125 described above in FIG. 1.

Additionally, as described above, the simplified process flow and components 502, 504, 506, and 508 of the travel destination system 500 may be implemented by processing logic which may be implemented in software, firmware, hardware, or any combination thereof. Accordingly, in these embodiments, the travel destination system 500 may be implemented using (and/or configured with) the components 502, 504, 506, and 508 to segment and accurately predict a target region for a target user based on payment transaction data, predictive models, and so on. Such process flow is further described below in accordance to one or more embodiments described herein.

As shown in FIG. 5, the travel destination system 500 may illustrate one example of the process flow for: (i) identifying a target user with a high propensity (or likelihood) of traveling in an upcoming predetermined time period based on historical payment transaction data, as shown at block 502; (ii) implementing (or computing, generating, deploying, etc.) a predictive model with machine learning algorithms based on the target user's historical payment transaction data, as shown at block 504; (iii) generating a plurality of propensity scores (or target scores/variable) for a plurality of target regions (or corridors) based on the overall data generated by the predictive model, as shown at block 506; and (iv) predicting (or segmenting/determining) a target region for the target user based on the maximum (or highest ranked) propensity score generated by the plurality of propensity scores, which may be used to create a ranked list of the propensity scores (or a list of the propensity scores rankings), as shown at block 508.

In particular, at block 502, a processor (e.g., the payment processor 112 of FIG. 1, the transaction service provider processor 202 of FIG. 2, and the issuing institution processor 219 of FIG. 2) may identify a target user with a propensity of initiating transactions in one or more target regions within a predetermined time period based on transaction data such as the target user's spend categories and/or any other pre-travel (or relevant) patterns.

At block 504, the processor may deploy (or generate) a predictive model with machine learning algorithms based on the target user's historical payment transaction data, where the predictive model may be a GBM model deployed on historical payment transaction data that may be used to predict target regions for target users through relevant patterns. For example, the predictive GBM model may: (i) create a structured set of trees for improved predictions (or increased accuracy) (e.g., a TreeNet GBM model), where the structured set of trees may create a first tree deployed (or grown) on an original target region, a second tree deployed on residuals from the first tree, and so on, (ii) score all the features and provide a consolidate score at a target level, and (iii) deploy the structured set of trees based on real-time dataflow provided via the cloud (or the like).

At block 506, the processor may generate a plurality of propensity scores for a plurality of target regions (e.g., USA, UK, MENA, Europe, etc.) based on the overall data generated by the predictive model and past transaction data. At block 508, the processor may predict a target region for the target user based on a maximum (or highest) propensity score of a ranked list of target regions and their respective overall propensity score. For example, the target region (e.g., USA) may have been ultimately predicted based on the predictive model's learnings from past patterns of travelers to the USA, where the predictive model accordingly scored USA as the final predicted target region due to various key transactional patterns and variables associated with the USA such as the level of engagement, and spendings at a specific airline, a specific hotel (or hotel website), and so on.

Note that the travel destination system 500 may include fewer or additional components and processing steps based on the desired processing design.

Figure 6:
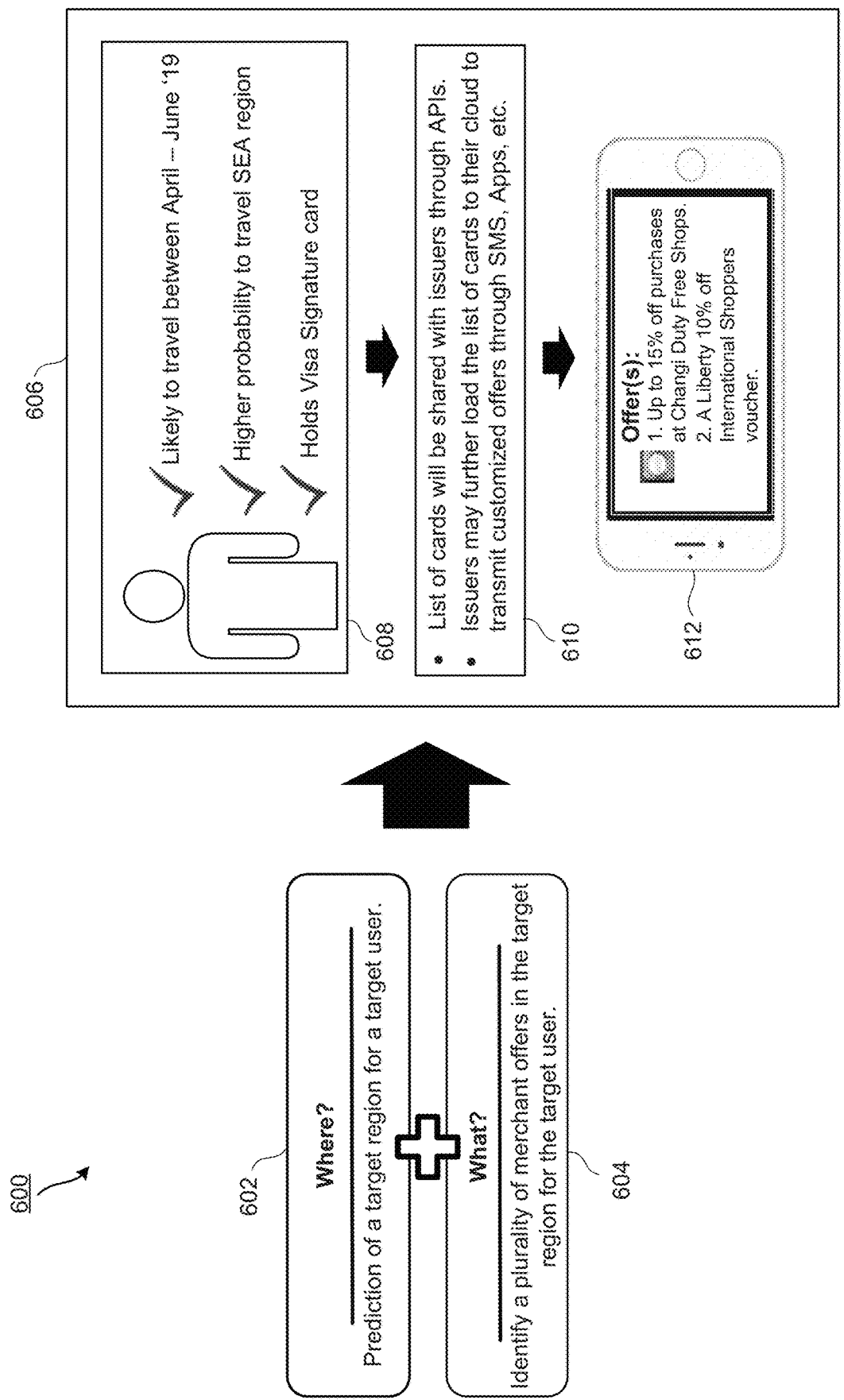
FIG. 6 is an illustration of a block diagram of a travel destination system for transmitting one or more merchant offers to a target user in a target region based on historical travel activity, according to some embodiments.

FIG. 6 is an illustration of a simplified block diagram of a travel destination system 600 for predicting a target region for a target user based on historical travel activity, according to some embodiments. The travel destination system 600 may be substantially similar to—and implemented similarly to—the travel destination system 125 described above in FIG. 1. As such, in some embodiments, the travel destination system 600 may be configured (or implemented) with one or more components 602, 604, 606, 608, 610, and 612, where these components shown in FIG. 6 may act and/or be used similar to the one or more respective components of the travel destination system 125 described above in FIG. 1.

For example, at blocks 602 and 604, a processor (e.g., the payment processor 112 of FIG. 1, the transaction service provider processor 202 of FIG. 2, and the issuing institution processor 219 of FIG. 2) may both predict a target region "where" a target user may be traveling to in a predetermined time period, and identify a plurality of merchant offers or "what" is available in the predicted target region for the target user to therefore identify and transmit one or more personalized merchant offers to the target user, prior to traveling to the predicted target region and/or during travel at the predicted target region.

At block 606, after ascertaining "where" and "what", the processor may perform several actions, as shown at blocks 608, 610, and 612, based on the predicted target region shown in block 602, and the identified merchant offers shown in block 604, to ultimately build focused/custom campaigns with one or more of the target users, the merchants, the payment processors, the issuers, the transaction service providers, and so on. For example, at block 608, the processor may identify several key transactional patterns and variables such as likely travel time periods, higher probability target regions, and engagement level. At block 610, the processor may communicate a list of identified target users (or account holders) to an issuer or the like (e.g., the payment processor 112 of FIG. 1, the issuing institution 204 of FIG. 2, etc.), where the issuer may further load it to their cloud to communicate personalized offers to one or more of the identified target users either through SMS, Apps, or the like, as shown at block 612.

Note that the travel destination system 600 may include fewer or additional components and processing steps based on the desired processing design.

Figure 7:
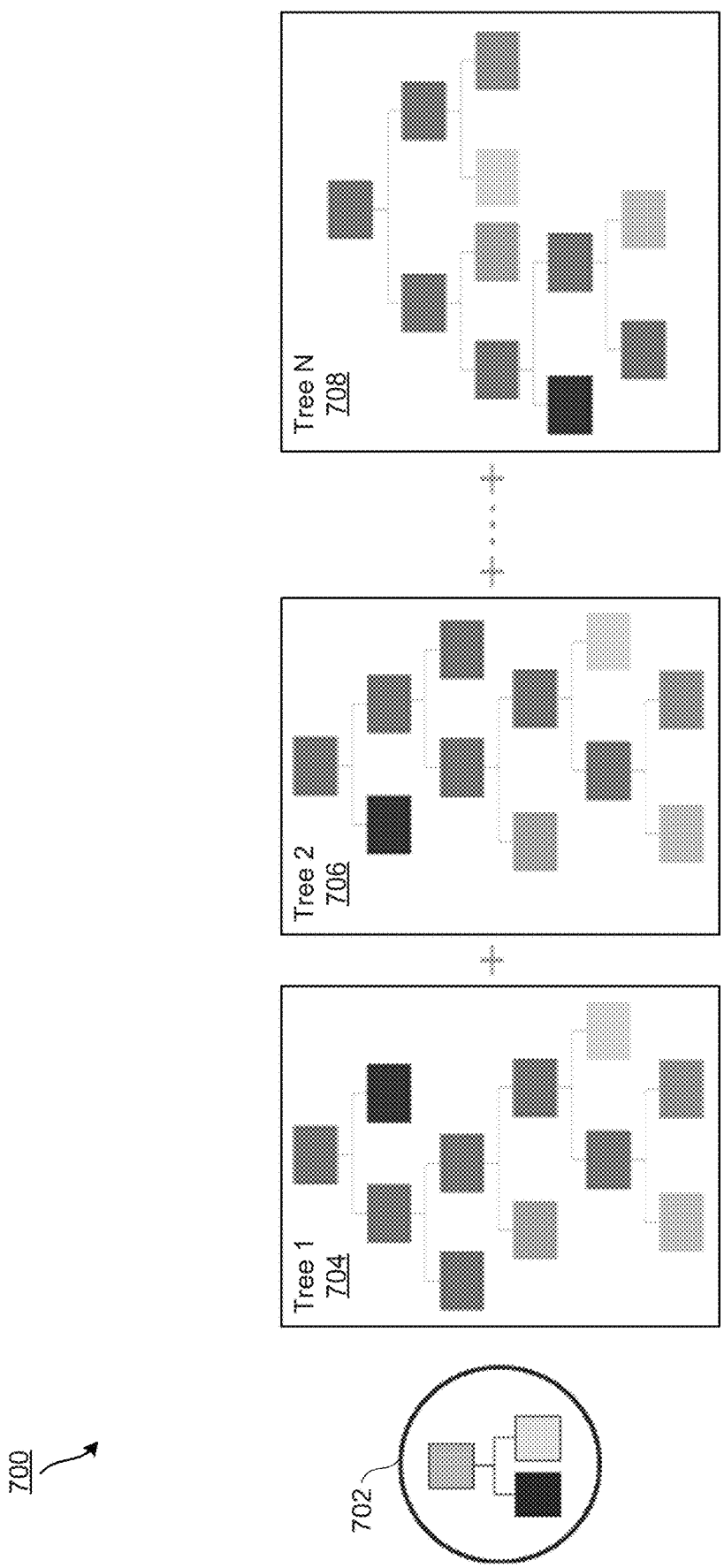
FIG. 7 is an illustration of a block diagram of a predictive model for segmenting a target user in a target region based on historical travel activity, according to some embodiments.

FIG. 7 is an illustration of a block diagram of a predictive model 700 for predicting a target region for a target user based on historical travel activity, according to some embodiments. In some embodiments, the predictive model 700 may include a plurality of model tree structures 704, 706, and 708 that are used to generate a combined model tree structure 702. Additionally, in these embodiments, the predictive model 700 may be used to generate a distinct score for each of the model tree structure 704, 706, and 708, where each of the distinct scores of the model tree structures 704, 706, and 708 may be summed to then generate an overall score for the combined model tree structure 702. In some embodiments, the predictive model 700 may be implemented (or performed) with a payment processor (e.g., the payment processor 112 of FIG. 1), a travel destination system (e.g., the travel destination system 125 of FIG. 1 and/or the travel destination system 200 of FIG. 2), one or more components of an electronic payment processing system (e.g., the electronic payment processing system 100 of FIG. 1), and/or any other such component. The predictive model 700 may be implemented by processing logic which may be implemented in software, firmware, hardware, or any combination thereof.

The predictive model 700 may be a machine learning algorithm comprised of one or more algorithms (e.g., the first algorithm, the second algorithm, and so on), where the machine learning algorithm may be configured to implement (or apply) transaction data for each user. The machine learning algorithm may be any machine-learning algorithm capable of making the predictive model 700 more accurate over time based on prior transaction data (e.g., historical traveling activity), a plurality of transaction parameters, and/or one or more external parameters. In some non-limiting embodiments, the machine-learning algorithm of the predictive model 700 may be comprised of a machine learning gradient boosted model, such as a TreeNet gradient boosted model.

By using a gradient boosted model, the predictive model 700 may generate numerous distinct model tree structures 704, 706, and 708 based on the combination of transaction parameters that may be used to score a user such as a target user. The scores of the distinct model tree structures 704, 706, and 708 are summed to provide a single score for the user (or a single user score). As described herein, the predictive model 700 may implement these model tree structures 702, 704, 706, and 708 to help determine a predicted travel region (or a target region) for the user through complex machine learning algorithms, where such learning algorithms may implement the Salford systems GBM techniques (or the like) that learn from users' pre-travel behaviors at a market level and deploy the learnings from the users' pre-travel behaviors to determine the predicted travel region at a card level.

In some embodiments, the predictive model 700 may be comprised of several hundred to several thousand small model tree structures—each model tree structure devoted to a portion of the overall model tree structure. The model tree structures of the predictive model 700 may be built through a sequential error-correcting process that results in higher accuracy and consolidates all of individual model tree structure contributions. That is, according to some embodiments, the predictive model 700 may be comprised of a first model tree structure 704 ("Tree 1"), a second model tree structure 706 ("Tree 2"), and an Nth model tree structure 708 ("Tree N"). As such, in these embodiments, the first model tree structure 704 may be the $1^{st}$ tree grown on an original target (e.g., a target user, a target region, etc.), the second model tree structure 706 may be the $2^{nd}$ tree grown on residuals from the $1^{st}$ tree grown as such predictions are made to improve the $1^{st}$ first tree, and the Nth model tree structure 708 may be the Nth tree grown on residuals from all previous trees (i.e., the Nth tree grown may be any desired number).

The predictive model 700 may be comprised of numerous ("N") different decision trees (e.g., N trees) such as the model tree structures 704, 706, and 708, where each tree has a probability score, and where the Nth tree ("Tree N") may be depicted by the model tree structure 708. Accordingly, the scores of the model tree structures 704, 706, and 708 are added such that Tree N (or the Nth model tree structure 708) represents the Nth tree grown on residuals from all of the previous trees, and thus represents the combined score (or the sum) of the probability scores of each of the previous trees. It will be appreciated that, in other non-limiting embodiments, the machine learning algorithm includes other various advanced statistical methods and tools for modeling users' propensity for engaging in an activity based on prior data.

As described above, the predictive model 700 may be a machine learning gradient boosted model (or the like) implemented to drive usage through cross-border marketing activities before/during travel season for a target user in a target region based on historical traveling activity of the target user in the target region. This machine learning gradient boosted model may be a robust model used to capture/identify travelers (e.g., the target users), travel destinations, and/or merchant offers. The predictive model 700 may utilize a target user prediction engine (e.g., the user engine 127 of FIG. 1), a destination prediction engine (e.g., the destination engine 129 of FIG. 1), and/or a category prediction engine (e.g., the recommendation engine 136 of FIG. 1).

Accordingly, in these embodiments, the destination engine may be used to calculate propensity scores for the target regions (or corridors) using a predictive model such as the predictive model 700 (or the like). In some embodiments, the destination engine may rank the calculated propensity scores of the target regions of the target users to identify (or determine) a particular target region for a particular target user, where the target users may be ranked relative to one another based at least partially on historical traveling activity, prior transaction data, transaction parameters, and/or external parameters (and/or the like). For example, the particular target user may be identified from the calculated propensity scores of the target users that has a higher propensity to initiate transaction activity, such as by using their portable financial device, in the particular target region. In some embodiments, the destination engine may use the ranked target users to identify (or determine/select) the particular target region for the particular target user from the top 10% of the plurality of target users or any other top desired percentage of the plurality of target users, such as the top 15%, top 20%, top 25%, top 30%, top 33%, top 35%, top 40%, top 45%, top 50%, and the like. It will be appreciated that any percentage of the plurality of target users may be included in the target users.

Thereafter, the recommendation engine may be used to identify a plurality of merchant offers in the particular target region based on at least on transaction data for spend categories initiated by the particular target user in the particular target region. Additionally, the recommendation engine may then transmit one or more identified merchant offers in the particular target region to the particular target user before/during the predetermined time period (e.g., as shown with the merchant offers 140 of FIG. 1 that are transmitted to the user 118 or the user device 142 of the user 118). In one embodiment, the recommendation engine may implement a MBA technique to identify the next likely spend categories in the particular target region for the particular target user during the predetermined time period, where such identified spend categories are then used to select (or identify) the top merchant offers for the particular target user before traveling to and/or during travel in the particular target region. In some embodiments, the recommendation engine may select/identify the top merchant offers for the particular target user based on one or more card profile parameters including target regions, card percentages, top association categories, available merchant offers, and so on. For example, the merchant offers transmitted to the particular target user may include an offer of 10% off international shoppers' vouchers, an offer of 5% off when you spend next on the duty free stores, and so on.

Note that the predictive model 700 may include fewer or additional components and processing steps based on the desired processing design.

Figure 8:
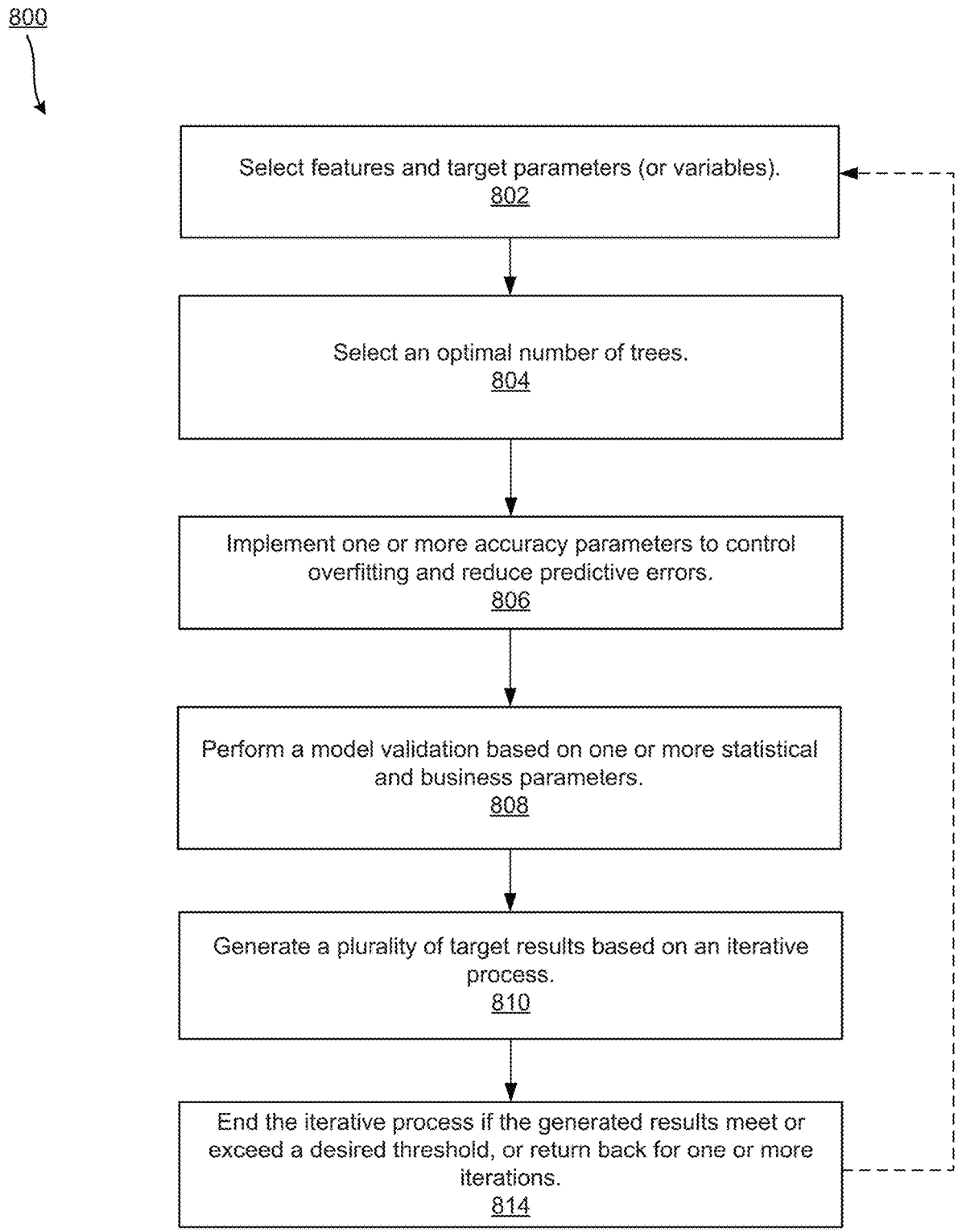
FIG. 8 is an illustration of a flow diagram of a predictive model for segmenting a target user in a target region based on historical travel activity, according to some embodiments.

FIG. 8 is an illustration of a process flow diagram 800 of a method for a predictive model to predict a target region for a target user based on historical travel activity, according to some embodiments. The process flow 800 may be implemented (or performed) by one or more processors (e.g., the payment processor 112 of FIG. 1, the transaction service provider processor 212 of FIG. 2, or the like), when configured by one or more components of a processing payment system (e.g., the payment processing systems 100 and 200 of FIGS. 1-2, the travel destination system 125 of FIG. 1, the one or more components of the travel destination system 125 of FIG. 1, or the like) that are stored in computer-readable memory (or the like) of one or more servers (e.g., the servers 120 of FIG. 1) and/or other computers. Additionally, the process flow diagram 400 may be implemented by processing logic which may be implemented in software, firmware, hardware, or any combination thereof.

Additionally, according to some embodiments, the process flow 800 may be implemented similarly to the process flows 300 and 400 described above in FIGS. 3-4. As such, the process flow 800 described herein may be configured to execute the method for accurately predicting the target region for the target user based on the payment transaction data, predictive models, and so on, according to some embodiments. Furthermore, in some embodiments, the process flow 800 may be implemented with a predictive model, such as an actively learning model (or the like) that is associated with one or more complex machine learning algorithms using Salford Systems' GBM techniques. An example of such process flow (or method) is further described below in accordance to one or more embodiments described herein.

At block 802, a payment processor, such as the payment processor 112 of FIG. 1, may select features and target parameters (or variables) for the predictive model. For example, at block 802, the processor may be fed target variable and training data, where the training data may be a set of approximately 300 features (or greater than 300 features, less than 300 features, and/or a set of any desired features) based on transaction data pertaining to users' demographics, spend patterns, and so on. At block 804, the payment processor may select/determine an optimal number of trees for the predictive model. For example, at block 804, the processor may select/determine a set of 500 trees for improved predictions, while in other examples any number of trees may be selected. Note that selecting smaller values of the learning rate may lead to larger training risk for the same number of iterations, while each iteration reduces the training risk. Also note that the risk can be made arbitrarily small if the selected number of trees is large enough such as 500 trees or the like.

At block 806, the payment processor may implement one or more accuracy parameters to control overlifting and reduce predictive errors for the predictive model. For example, at block 806, the processor may implement a combination of a predetermined learning rate, predetermined tree complexity, and predetermined number of trees as the accuracy parameters to ensure minimum predictive error, to control the overfitting issues of the predictive model, and to avoid inflating the smaller values for predictions. At block 808, the processor may perform a model validation based on one or more statistical and business parameters for the predictive model. For example, at block 808, the processor may perform an exhaustive validation model based on the following statistical and business parameters: (1) Confusion Matrix, (2) ROC, (3) Gini Coefficient, (4) Misclassification test, and (5) Significant features and level of importance.

At block 810, the processor may generate a plurality of target results based on an iterative process (continuous, uninterrupted process) (i.e., as shown below at block 812, the iterative process may continue to generate target results based on the real-time data continuously fed to the predictive model, until/unless the generated target results meet (or satisfy) a desired/selected threshold (or a predetermined satisfaction threshold)). As such, at block 812, the processor may (i) end the iterative process if the generated results meet or exceed the desired threshold, or (ii) to return back to the initial block 802 for one or more iterations if the generated results do not meet the desired threshold.

Note that the process flow 800 may include fewer or additional components and processing steps based on the desired processing design.

Figure 9:
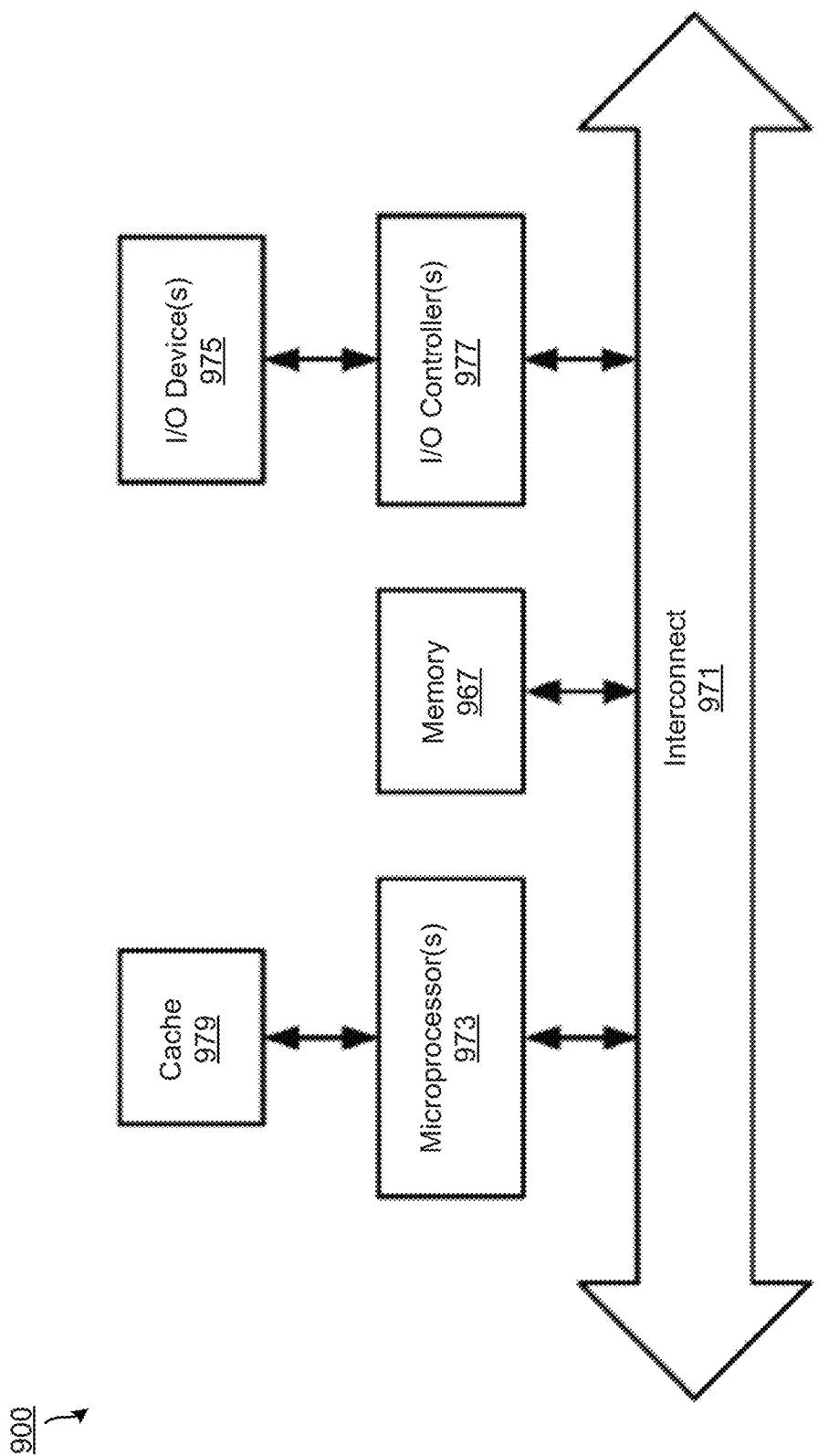
FIG. 9 is an illustration of a block diagram of a computer system, according to some embodiments.

FIG. 9 illustrates an example device suitable for use to practice various aspects of the present disclosure, according to some embodiments. FIG. 9 illustrates an example device suitable for use to practice various aspects of the present disclosure, in accordance with various embodiments. While FIG. 9 illustrates various components of a computer system, it is not intended to represent any particular architecture or manner of interconnecting the components. One embodiment may use other systems that have fewer or more components than those shown in FIG. 9.

In FIG. 9, the data processing system 900 includes an inter-connect 971, e.g., bus and system core logic, which interconnects a microprocessor(s) 973, memory 967, and input/output (I/O) device(s) 975 via I/O controller(s) 977. The microprocessor 973 is coupled to cache memory 979. I/O devices 975 may include a display device and/or peripheral devices, such as mice, keyboards, modems, network interfaces, printers, scanners, video cameras and other devices known in the art. In one embodiment, when the data processing system is a server system, some of the I/O devices 975, such as printers, scanners, mice, and/or keyboards, are optional.

In one embodiment, the interconnect 971 includes one or more buses connected to one another through various bridges, controllers and/or adapters. In one embodiment, the I/O controllers 977 include a USB (Universal Serial Bus) adapter for controlling USB peripherals, and/or an IEEE-1394 bus adapter for controlling IEEE-1394 peripherals.

In one embodiment, the memory 967 includes one or more of: ROM (Read Only Memory), volatile RAM (Random Access Memory), and non-volatile memory, such as hard drive, flash memory, etc. Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. That is, the techniques may be carried out in a computer system or other data processing system such as the payment processing system 100 of FIG. 1 in response to its processor, such as a microprocessor, executing sequences of instructions contained in a memory, such as ROM, volatile RAM, non-volatile memory, cache or a remote storage device.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

In embodiments, a storage medium may store instructions for practicing methods described with references to FIGS. 1-9, in accordance with various embodiments. For example, a non-transitory computer-readable storage medium may include a number of programming instructions. Programming instructions may be configured to enable a device, e.g., the device 900, in response to execution of the programming instructions, to perform, e.g., various operations associated with an example game to be operated on a computing device based on payment transactions in an electronic payment transaction processing network, e.g., the routinely adjusted intelligent fraud rules to be configured to operate on a computing device to automatically monitor and adjust the FPR performance of fraudulent transaction rules for issuers, or other operations described herein.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

The non-transitory computer-readable storage medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, ROM, RAM, flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Lastly, note that, the description and drawings are illustrative and are not to be construed as limiting. The present disclosure is illustrative of disclosed features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

What is claimed is:

1. A computer-implemented method, comprising:
   identifying, by a processor, a target user from a plurality of users based on payment transaction data;
   determining, by the processor, a plurality of target regions for the target user based on results of a machine learning model, wherein the machine learning model transforms the payment transaction data of the target user and of the plurality of users or past patterns of pretravel behavior of the target user and of the plurality of users into a predictive model using a gradient boosting model (GBM),
   wherein the GBM takes as input data from a data pipeline of the target user and from data pipelines of the plurality of users, wherein the data pipelines include training data or a plurality of features based on the payment transaction data of the target user and of the plurality of users pertaining to the demographics, spend patterns, or spend categories
   wherein an initial tree structure of the GBM is grown on an initial target region and subsequent tree structures are grown on residuals from the first tree structure based upon the input data, wherein each of the subsequent tree structures are associated with a different target region, the GBM determining computed travel destination predictions that improve with each subsequent tree structure;

generating, by the processor, using the GBM of the machine learning model, a propensity score associated with each of the plurality of the target regions based on the initial tree structure and each of the subsequent tree structures based on the payment transaction data of the target user and of the plurality of users or the past patterns of pretravel behavior of the target user and of the plurality of users;

identifying, by the processor, a target region for the target user based on the plurality of propensity scores for the plurality of target regions, wherein the plurality of propensity scores are ranked into a list of target region rankings, and wherein the target region is a maximum score in the list of target region rankings; and transmitting the identified target region to a third party to indicate a location where the target user is likely to next make a purchase.

2. The method of claim 1, wherein the plurality of propensity scores are generated by the predictive model.

3. The method of claim 1, wherein the payment transaction data of the target user and of the plurality of users is associated with one or more transaction parameters related to at least one or more of the target user at a market level, and the plurality of users at the market level.

4. The method of claim 3, wherein the one or more transaction parameters are comprised of at least one or more of pre-travel transactions, pre-travel patterns, pre-travel behavior, electronic commerce transactions, electronic commerce spending categories, overall user engagement in electronic commerce transactions, overall user engagement in overall transactions, and increased frequency or volume in electronic transactions.

5. The method of claim 1, the machine learning model comprising one or more model parameters to control overfitting issues with respect to the GBM, and wherein the one or more model parameters include a selected one or more of: learning rate, tree complexity, transaction data features, target variables, a predetermined number of tree classes, number of trees, accuracy parameters, statistical parameters, or business parameters.

6. A system, comprising:
a transaction database storing payment transaction records;
a processor having access to the transaction database; and
a software component executed by the processor that is configured to:
identify a target user from a plurality of users based on payment transaction data;
determine a plurality of target regions for the target user based on results of a machine learning model, wherein the machine learning model transforms payment transaction data of the target user and the plurality of users into a predictive model using a gradient boosting model (GBM), wherein the GBM takes as input data from a data pipeline of the target user and from data pipelines of the plurality of users, wherein the data pipelines include training data or a plurality of features based on the payment transaction data of the target user and of the plurality of users pertaining to the demographics, spend patterns, or spend categories of the target user or plurality of users, wherein an initial tree structure of the GBM is grown on an initial target region and subsequent tree structures are grown on residuals from the first tree structure based upon the input data, wherein each of the subsequent tree structures are associated with a different target region, the GBM determining computed travel destination predictions that improve with each subsequent tree structure, wherein the target user has a propensity for initiating transaction activity in the plurality of target regions within a predetermined time period;

generate using the GBM of the machine learning model, a propensity score associated with each of the plurality of the target regions based on the initial tree structure and each of the subsequent tree structures based on the payment transaction data of the target user and of the plurality of users or the past patterns of pretravel behavior of the target user and of the plurality of users;

identify a target region for the target user based on the plurality of propensity scores for the plurality of target regions, wherein the plurality of propensity scores are ranked into a list of target region rankings, and wherein the target region is a maximum score in the list of target region rankings; and transmit the identified target region to a third party to indicate a location where the target user is likely to next make a purchase.

7. The system of claim 6, wherein the plurality of propensity scores are generated by the predictive model.

8. The system of claim 6, wherein the GBM is comprised of a plurality of structured set of tree classes.

9. The system of claim 6, wherein the payment transaction data of the target user and of the plurality of users is associated with one or more transaction parameters related to at least one or more of the target user at a market level, and the plurality of users at the market level.

10. The system of claim 9, wherein the one or more transaction parameters are comprised of at least one or more of pre-travel transactions, pre-travel patterns, pre-travel behavior, electronic commerce transactions, electronic commerce spending categories, overall user engagement in electronic commerce transactions, overall user engagement in overall transactions, and increased frequency or volume in electronic transactions.

11. The system of claim 8, wherein the GBM model is comprised of one or more model parameters, and wherein the one or more model parameters include learning rate, tree complexity, transaction data features, target variables, a predetermined number of tree classes, accuracy parameters, statistical parameters, and business parameters.

12. A non-transitory computer-readable medium containing program instructions for:
identifying, by a processor, a target user from a plurality of users based on payment transaction data;
determining, by the processor, a plurality of target regions for the target user based on results of a machine learning model, wherein the machine learning model transforms the payment transaction data of the target user and of the plurality of users and past patterns of pretravel behavior of the target user and of the plurality of users into a predictive model using a gradient boosting model (GBM), wherein the GBM takes as input data from a data pipeline of the target user and from data pipelines of the plurality of users, wherein the data pipelines include training data or a plurality of features based on the payment transaction data of the target user and of the plurality of users pertaining to the demographics, spend patterns, or spend categories, wherein an initial tree structure of the GBM is grown on an initial target region and subsequent tree structures are grown on residuals from the first tree structure based upon the input data, wherein each of the subsequent tree structures are associated with a different target region, the GBM determining computed travel destination predictions that improve with each subsequent tree structure, wherein the target user has a propensity for initiating transaction activity in the plurality of target regions within a predetermined time period;

generating, by the processor, using the GBM of the machine learning model, a propensity score associated with each of the plurality of the target regions based on the initial tree structure and each of the subsequent tree structures based on the payment transaction data of the target user and of the plurality of users or the past patterns of pretravel behavior of the target user and of the plurality of users;

identifying, by the processor, a target region for the target user based on the plurality of propensity scores for the plurality of target regions, wherein the plurality of propensity scores are ranked into a list of target region rankings, and wherein the target region is a maximum score in the list of target region rankings; and transmitting the identified target region to a third party to indicate a location where the target user is likely to next make a purchase.

13. The non-transitory computer-readable medium of claim 12, wherein the plurality of propensity scores are generated by the predictive model.

14. The non-transitory computer-readable medium of claim 12, wherein the GBM is comprised of a plurality of structured set of tree classes, wherein the GBM is comprised of one or more model parameters, and wherein the one or more model parameters include learning rate, tree complexity, transaction data features, target variables, a predetermined number of tree classes, accuracy parameters, statistical parameters, and business parameters.

15. The non-transitory computer-readable medium of claim 12, wherein the payment transaction data of the target user and of the plurality of users is associated with one or more transaction parameters related to at least one or more of the target user at a market level, and the plurality of users at the market level.

16. The non-transitory computer-readable medium of claim 15, wherein the one or more transaction parameters are comprised of at least one or more of pre-travel transactions, pre-travel patterns, pre-travel behavior, electronic commerce transactions, electronic commerce spending categories, overall user engagement in electronic commerce transactions, overall user engagement in overall transactions, and increased frequency or volume in electronic transactions.

* * * * *

UNITED STATES PATENT AND TRADEMARK OFFICE
CERTIFICATE OF CORRECTION

| | |
|---|---|
| PATENT NO. | : 11,341,530 B2 |
| APPLICATION NO. | : 16/749192 |
| DATED | : May 24, 2022 |
| INVENTOR(S) | : Hardeep Singh Malhotra, Ghanashyama Mahanty and Avinash Gupta |

It is certified that error appears in the above-identified patent and that said Letters Patent is hereby corrected as shown below:

On the Title Page

Please add the following to Column 1, (72) Inventors:, Line 3:
-- Avinash Gupta, Dubai (AE) --

Signed and Sealed this
Sixteenth Day of July, 2024

Katherine Kelly Vidal
*Director of the United States Patent and Trademark Office*